United States Patent
Avrahami

(10) Patent No.: US 9,478,060 B2
(45) Date of Patent: Oct. 25, 2016

(54) TECHNIQUES TO PROVIDE DEPTH-BASED TYPEFACE IN DIGITAL DOCUMENTS

(71) Applicant: Intel Corporation, Santa Clara, CA (US)

(72) Inventor: Daniel Avrahami, Mountain View, CA (US)

(73) Assignee: INTEL CORPORATION, Santa Clara, CA (US)

( * ) Notice: Subject to any disclaimer, the term of this patent is extended or adjusted under 35 U.S.C. 154(b) by 713 days.

(21) Appl. No.: 13/623,907

(22) Filed: Sep. 21, 2012

(65) Prior Publication Data

US 2014/0085292 A1    Mar. 27, 2014

(51) Int. Cl.
*G06T 15/00* (2011.01)
*G06F 17/21* (2006.01)
*H04N 13/04* (2006.01)
*G06F 17/24* (2006.01)

(52) U.S. Cl.
CPC ............... *G06T 15/00* (2013.01); *G06F 17/21* (2013.01); *G06F 17/211* (2013.01); *G06F 17/214* (2013.01); *H04N 13/0452* (2013.01); *H04N 13/0456* (2013.01); *G06F 17/24* (2013.01)

(58) Field of Classification Search
CPC ...... G06F 17/21; G06F 17/211; G06F 17/24; G06T 15/00; G09G 1/06; H04N 13/0456; H04N 13/0452
See application file for complete search history.

(56) References Cited

U.S. PATENT DOCUMENTS

| 5,805,783 A * | 9/1998 | Ellson ................ G06T 15/20 345/419 |
| 2003/0146973 A1* | 8/2003 | Swift .................. H04N 13/026 348/51 |
| 2005/0105118 A1* | 5/2005 | Yoshida ..................... 358/1.13 |
| 2006/0041848 A1* | 2/2006 | Lira ............................ 715/805 |
| 2007/0036437 A1* | 2/2007 | Razdan ............. G06K 9/4604 382/186 |
| 2007/0097208 A1* | 5/2007 | Takemoto ........... G06F 17/214 348/46 |
| 2007/0273706 A1* | 11/2007 | Berger ................ G06T 15/04 345/582 |
| 2010/0091012 A1* | 4/2010 | Newton et al. ............. 345/419 |
| 2011/0050687 A1* | 3/2011 | Alyshev ............. G06F 9/4443 345/419 |
| 2012/0151416 A1* | 6/2012 | Bell .................. G02B 27/2228 715/848 |

OTHER PUBLICATIONS

"About Font Embedding", https://msdn.microsoft.com/en-us/library/ms533034%28v=vs.85%29.aspx, Feb. 1, 2001.*
Habraken, Joe, "Office 2010 in Depth", Que Publishing, p., 102-103, 146-147, 150-151, 195-198, Oct. 2010.*
Screen shots of Word2010; copyright 2010.*
www.vision3d.com/stereo.html Apr. 13, 2011.*

* cited by examiner

*Primary Examiner* — Michelle L Sams

(57) ABSTRACT

An apparatus may include a processor circuit and a three-dimensional (3-D) typeface module that is operative on the processor circuit to provide a choice of one or more 3-D typefaces in a graphical user interface displayed on a digital display. The 3-D typeface component may be operable to determine that a selection of the 3-D typeface selection has been received and to apply the 3-D typeface to a selected set of characters in a digital document that includes editable text.

27 Claims, 13 Drawing Sheets

TECHNIQUES TO PROVIDE DEPTH-BASED TYPEFACE IN DIGITAL DOCUMENTS

BACKGROUND

Present day computer applications such as word processors provide to a user convenient mechanisms for creating, editing and viewing text-based documents in a variety of text formats. For example, standard font families such as Arial and Times New Roman and their base typefaces are used by millions of users on a daily basis to create or edit documents. A typeface, such as "Bold" or "Italic" is a common visual mechanism to create emphasis for text in printed documents and documents presented on a digital display.

Typically, a word processing program may provide to a user the ability to select a given font family, such as Times New Roman, from a variety of font families to present text of a document being edited or created. The word processing program may also allow the user to select from among multiple typefaces, which are sometimes referred to as "font styles" to be used in conjunction with a given font family. Thus, "Bold" typeface may be used with a Times New Roman font family to produce text that yields a Time New Roman Bold font. For text emphasis, word processors typically provide the ability to select a portion of the characters of a text document, such as a specific words or sentences, to be presented in a first typeface, such as "Bold." Other portions of the text document may be presented in a second typeface, such as a standard, non-bold typeface so that the text portions having Bolded typeface stand out from other text.

For documents other than text documents, other methods for emphasizing words have been developed in past generations. For example, "Kinetic Typography," which is used primarily in film and television (TV), involves animation in which motion and text are mixed to convey a particular idea or motion.

More recently, advances in display technology, processing, and film, have created a growing market for three-dimensional ("3D" or "stereoscopic") viewing of film, 3DTV, stereoscopic video games and computer displays. While depth has been used widely to present information such as images in 3D film and TV programming, depth is not employed in digital documents to convey emphasis.

Accordingly, there may be a need for improved techniques and apparatus to solve these and other problems.

DETAILED DESCRIPTION

Various embodiments are directed to enhancing the user experience for creating, viewing, and editing digital documents. In various embodiments, a new type of text typeface is employed to create a novel mechanism for text emphasis in a document, such as an editable text document. Consistent with some embodiments, the typeface may be interoperable with a stereoscopic display to generate stereoscopic characters that appear to be three dimensional (3-D) when presented on a stereoscopic display. The 3-D characters may form a portion of text that includes additional characters that appear as two dimensional (2-D) characters on the same stereoscopic display. In this manner, a novel form of text emphasis is generated when the document containing characters selected for the 3-D typeface is loaded for presentation on the stereoscopic display.

Figure 1:
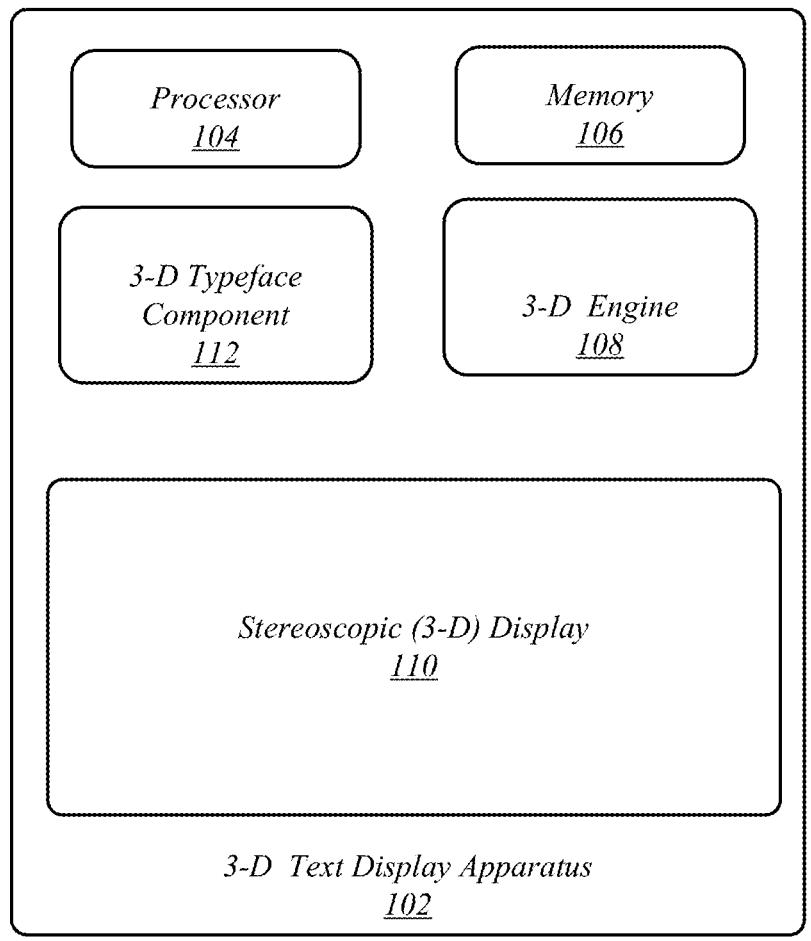
FIG. 1 illustrates a block diagram for an exemplary apparatus.

In various embodiments, a depth based, also termed "3-D," typeface component or module may be interoperative with a hardware component, such as a central processor unit, a display engine, or other logic to control presentation of documents containing 3-D typeface characters and optionally 2-D typeface characters. FIG. 1 depicts one example of an apparatus consistent with the present embodiments. The 3-D text display apparatus 102 of FIG. 1 may be embodied, for example, in a mobile device such as a laptop computer, tablet computing device, desktop computer, smartphone, or other electronic computing device or communications device, a television (TV), or videogame device. The embodiments are not limited in this context.

The 3-D text display apparatus 102 may be used in particular for presenting 3-D text within a text-based document. The term "3-D" is used herein to generally denote a text or an image that has the appearance of depth when presented on a stereoscopic display. Thus, "3-D" text may appear to have depth when shown on a stereoscopic display (also termed 3-D display herein). The term "text" as used herein, include alphanumeric characters, and may also refer to additional characters and symbols that are included in a text-based document. The 3-D text display apparatus 102 includes a processor 104, a memory 106, 3-D engine 108, 3-D display 110, and a 3-D typeface component (or module) 112.

In particular, in various embodiments the processor 104 and/or 3-D engine 108 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Consistent with the present embodiments, the 3-D text display apparatus may be capable of generating stereoscopic images of various objects including text. Examples of a digital display include a liquid crystal display (LCD), light emitting diode display (LED), touch sensitive display, plasma display, cathode ray tube, and other display types.

For example, the 3-D engine 108 may be operable according to known techniques to generate on the 3-D display 110 stereoscopic still images of objects, scenes, and the like, as well as to generate stereoscopic video images. As detailed below, the 3-D text display apparatus 102 may also generate stereoscopic text characters within a digital document, such as an editable text document. For example, the 3-D typeface component may operate in conjunction with the 3-D display engine 108 on a text-based file to generate 3-D characters within a text document being presented on the 3-D display 110, where the 3-D characters appear to have depth when presented on the 3-D display 110. At the same time, other characters within the text document presented on the 3-D display 110 may be rendered as 2-D characters that do not appear to have depth. In this manner, selected characters may be emphasized or de-emphasized to a user by presenting a combination of 2-D and 3-D characters within a given document.

Figure 2:
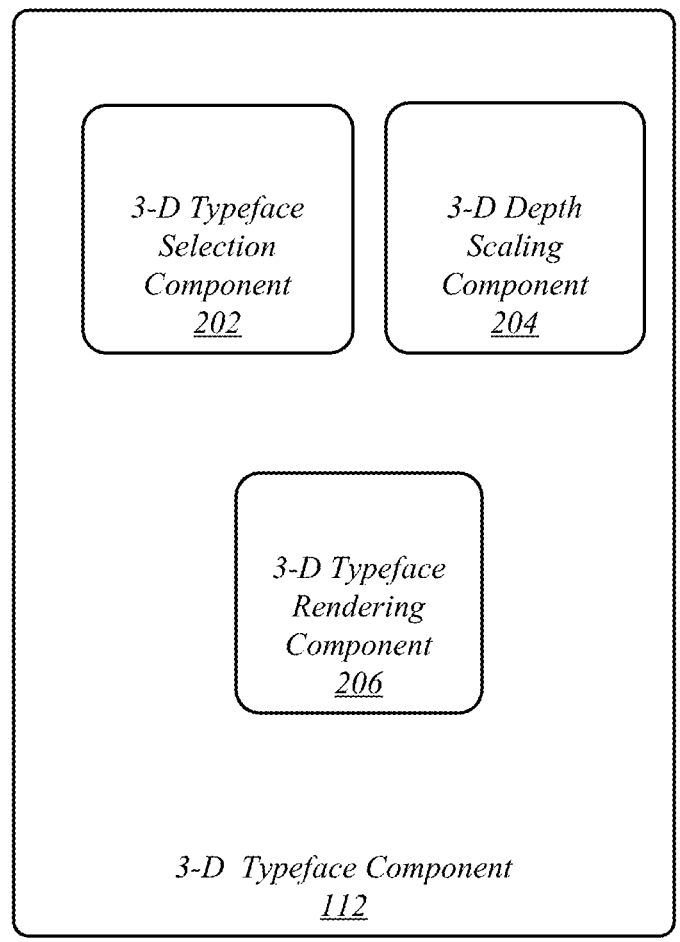
FIG. 2 depicts a block diagram of an exemplary component of the apparatus of FIG. 1.

FIG. 2 depicts details of the 3-D typeface component 112 consistent with various embodiments. As detailed with respect to the FIGs. to follow, the 3-D typeface component 112 may be used to perform various tasks, such as to create a text document, to edit a text document, and to render the text document for presentation on a display. In various embodiments, the 3-D typeface component 112 may be embodied in software, hardware, or a combination of software and hardware. As detailed below, the 3-D typeface component may include designed typefaces (3-D typefaces) that impart a stereoscopic appearance to text when presented on a digital 3-D display. The 3-D typeface component may also include logic to adjust the presentation of text including 3-D and/or 2-D typefaces according to the context in which the text is to be displayed, such as the type of display or medium to present the text, the size of a digital display to present the text, and other factors.

As shown in FIG. 2, the 3-D typeface component 112 may include a 3-D typeface selection component 202 that facilitates selection of 3-D typeface to be applied in a text document. In addition, the 3-D typeface component 112 may contain a 3-D depth scaling component 204 that is operative to adjust the appearance of 3-D text based upon factors such as the font size of the text to be displayed. The 3-D display component 112 may further include a 3-D typeface rendering component 206 that can edit a text document and interpret the text document so as to generate text for presentation that takes into account, among other factors, the nature of the typeface to generate 3-D characters and the nature of the display to present the text.

Figure 3:
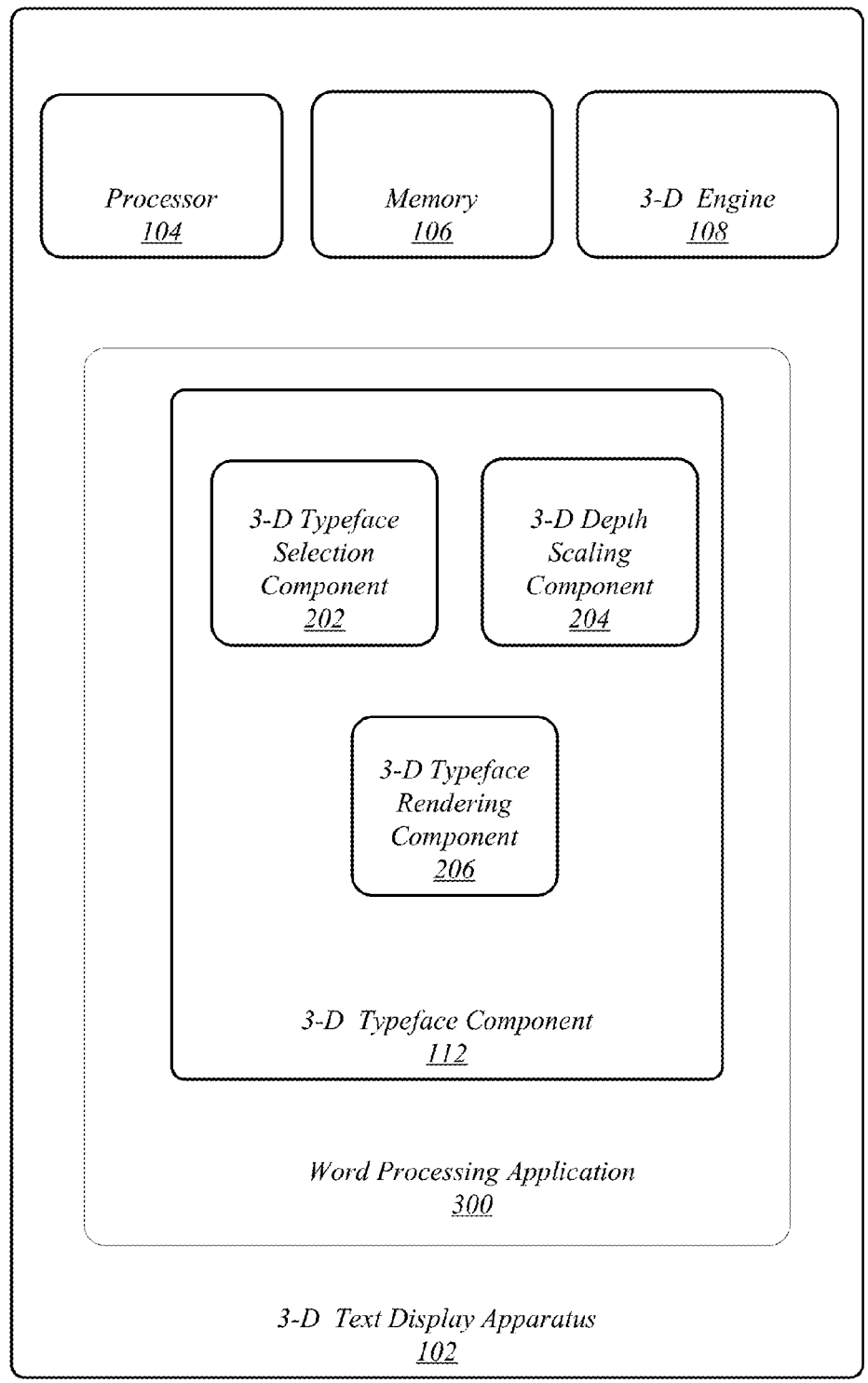
FIG. 3 depicts another block diagram of an exemplary apparatus.

In various embodiments, the 3-D typeface component 112 may be embodied in an application that is operative to generate and edit text documents. In operation, the 3-D typeface component 112 may provide to an application user the ability to create, store, edit, and/or view documents that include 3-D typeface. For example, one or more depth-based typefaces (3-D typefaces) may be created for different fonts, such as Arial, Helvetica, Times New Roman, and so forth. These 3-D typefaces may be provided as a 3-D typeface selection component 202 that is integrated into an application, such as a word processing application, as illustrated in FIG. 3. FIG. 3 depicts an embodiment in which a word processing application 300 includes the 3-D typeface component 112. However, in other embodiments, the 3-D typeface component 112 may be installed as a separate application and/or may form part of an operating system of a device rather than only operating in an individual application. As part of the 3-D typeface component 112, the 3-D typeface selection component 202 may provide a selection of 3-D typefaces that may be used with the word processing application 300. Consistent with the present embodiments, a word processing application may be arranged in different versions, including a 2-D version appropriate for conventional 2-D text documents, and a 3-D version that is appropriate for documents to include 3-D text. The 3-D version of the word processing application may be employed so that such documents can provide text emphasis by creating the appearance of text depth when presented on a stereographic display such as the 3-D text display apparatus 102.

Figure 4:
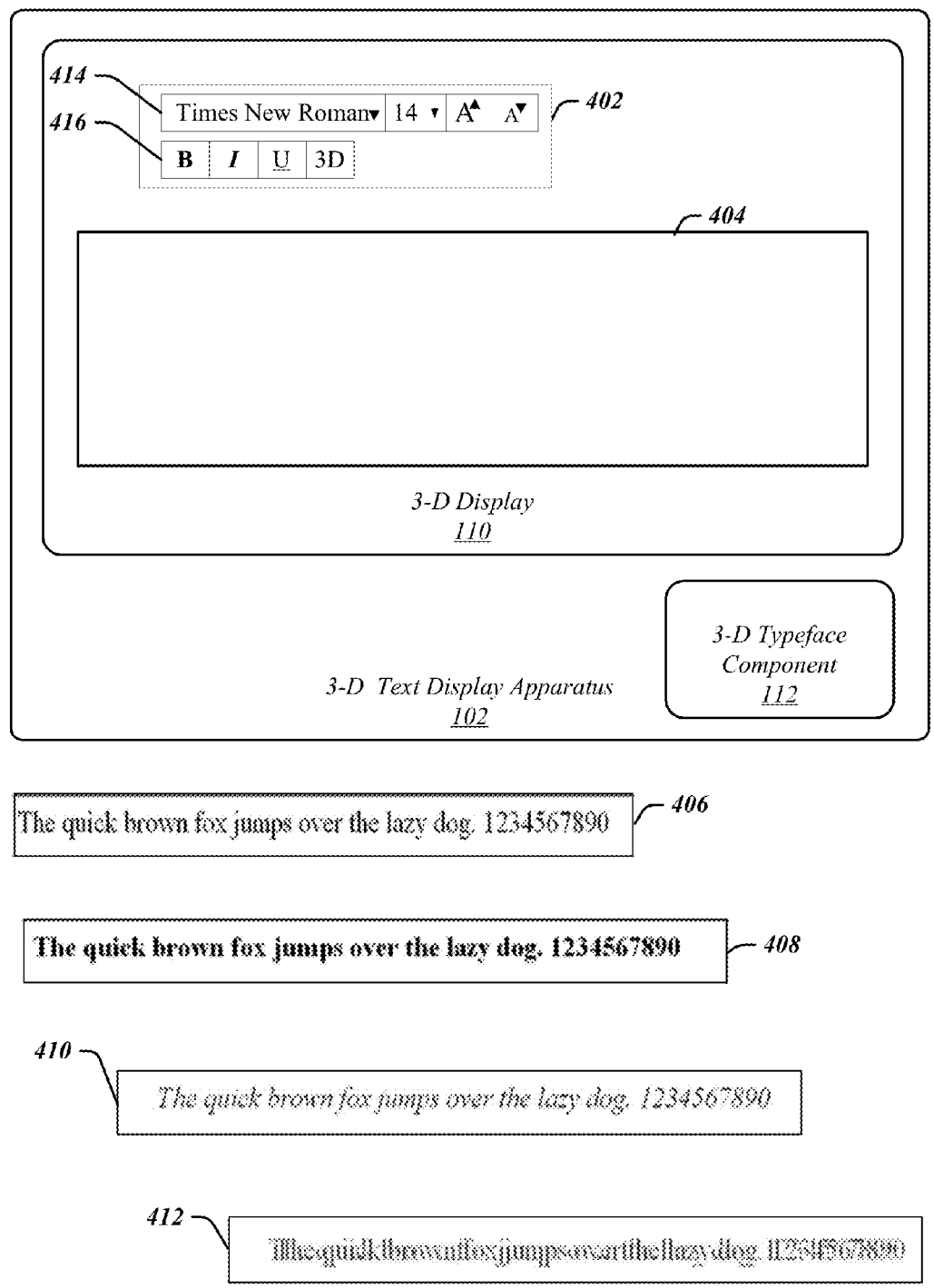
FIG. 4 depicts operation of an exemplary apparatus.

FIG. 4 depicts one scenario consistent with the present embodiments in which an application that includes the 3-D typeface component 112 is loaded and running in the 3-D text display apparatus 102. As illustrated, the 3-D display 110 presents a menu 402, which may be a formatting bar in some embodiments, and a document display area 404. When the application (not separately shown) is loaded and running, the application may format the document display area 404 in a manner such that the contents of at least a portion of the document being created, viewed, and/or edited are viewable. The menu 402 may provide various selections that allow features of a document to be manipulated, including the font and typeface of characters in the document being viewed in the document display area 404. It will be appreciated that other features (not shown) may be presented in the display, such as a title bar, a task bar, and other fields.

When the 3-D typeface component 112 is loaded, as illustrated in FIG. 4, the menu 402 includes a selection that allows a user to choose a 3-D typeface (shown as the "3D" icon) among other typefaces. As will be appreciated, in conventional word processing and other text applications, the appearance of text in the document or file being presented may be manipulated by selection of a font family and/or a typeface. As shown in FIG. 4, the menu 402 includes a scrollable font box 414 and typeface component area 416. The generation of 3-D typeface may be accomplished in conventional schemes by selecting from "bars" or menus that may list multiple selections. The menu 402 differs from conventional schemes in that a user may select the 3D icon in addition to other icons in order to manipulate text in the document being created, edited, or viewed. FIG. 4 further illustrates examples of text blocks for common text that may form a portion of a document being presented on the 3-D display 110. When a user is viewing, creating, or editing a document, it may be desirable that a portion of the text of the document has a standard, or normal appearance. As is well known, many font families have been developed, which are commonly available as selections in word processing and other applications that provide editable text. The text block 406 illustrates the appearance of text when a first font is presented, which in the example illustrated is Times New Roman (Regular or "standard"). For a text document a user may also prefer to change the font family, font size, and or the typeface for select text (characters) in order to provide emphasis to the select text. The text block 408 illustrates the appearance of the same text as that illustrated in text block 406 when Times New Roman Bold is selected. This text block may be generated when, for example, a user may first have selected Times New Roman font family for presentation of text in a document. The user may then select a bold appearance by engaging a "B" icon from the menu 402 to apply to the given text to generate the text block 408. As is known, standard methods to engage an icon include using selection means such as a mouse, touchpad, pointing device, or a digit in the case of a touch screen.

An alternative manner of presenting text emphasis according to conventional techniques is to apply italic typeface, as illustrated by the text block 410. The text block 410 may be generated by selection of the "I" icon of menu 402.

Consistent with the present embodiments, the menu 402 additionally presents a "3D" icon for selection by a user. The "3D" icon, when selected, allows a user to designate characters of a text document to be presented in a 3-D format such that the designated characters present a different appearance than a "Regular" typeface. The characters may present a 3-dimensional appearance in which the characters appear to have depth when shown on a 3-D display, as suggested by the text block 412. It is to be noted that the appearance of characters in the text block 412 of FIG. 4 is presented for purposes of illustration only and that in operation on an actual stereoscopic display, the characters of the text block 412 may not present the "double image" of FIG. 4. Rather, the text block 412 may present a stereoscopic image of the text that imparts a depth into the characters when viewed in normal binocular vision by a user in front the 3-D display 110, for example.

In various embodiments, and as detailed in the embodiments to follow, the application of a "3-D" typeface to text may be used in different ways to convey emphasis in an editable text document. For example, consistent with some embodiments selected 3-D text in a document may appear to have depth to a viewer when the text is presented on a 3-D display, while the selected 3-D text may appear as a two dimensional typeface that is different from a standard typeface when presented on a 2-D display. The selected 3-D text may also appear as a 2-dimensional typeface different from a standard typeface when printed on a medium such as paper.

Figure 5A:
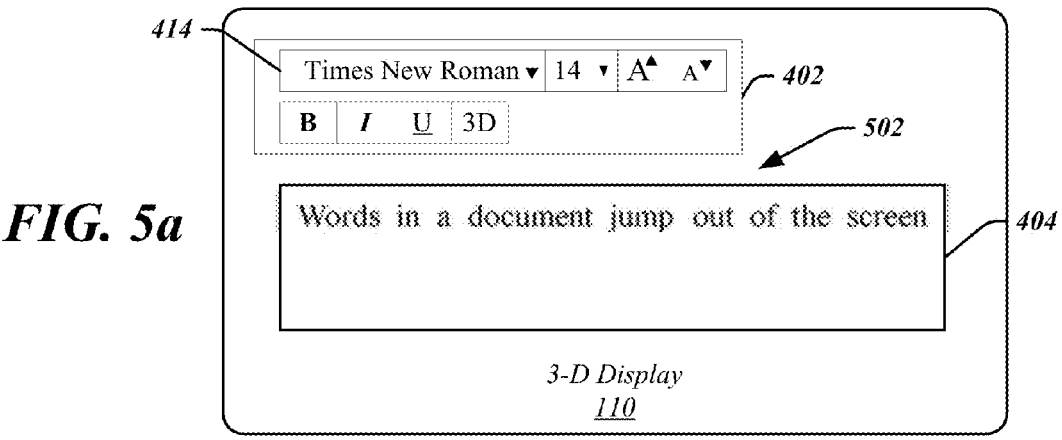
FIGS. 5a-5c depict further operation of an exemplary apparatus.
Figure 5B:
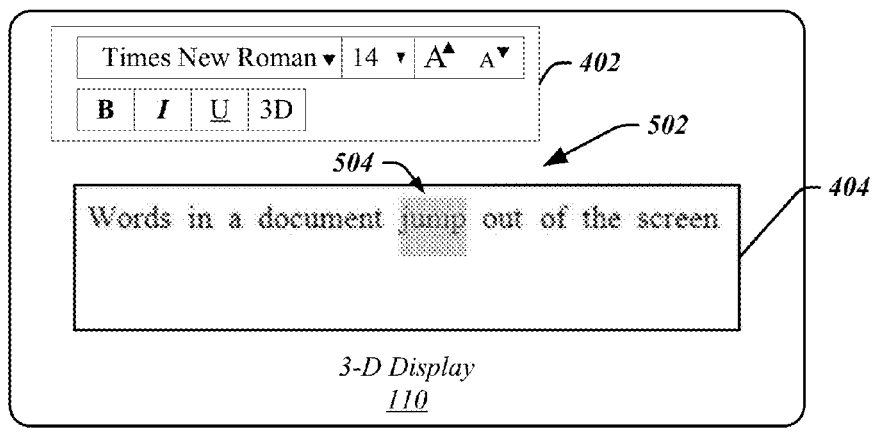
Figure 5C:
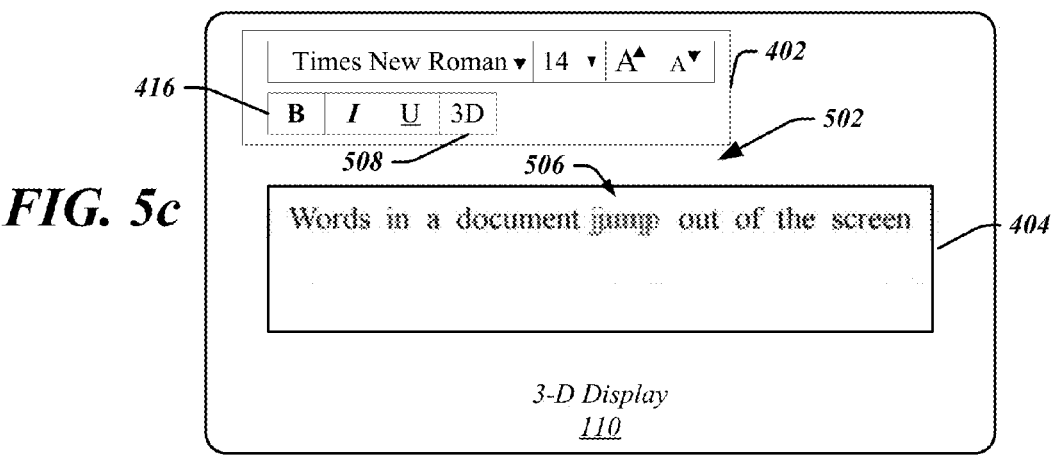

FIGS. 5a-5c depict operation of features of the present embodiments to provide 3-D emphasis to text in a document. The scenario depicted in FIGS. 5a-5c may be implemented on a 3-D display apparatus that is operative to generate stereoscopic objects including text on a 3-D display, such as the 3-D display 110. When an application such as a word processing application is loaded and running on the 3-D display apparatus, the 3-D display may present the document display area 404 and menu 402 as described above. The document may include text that is formatted in a conventional 2-D font and typeface, such as Times New Roman, as shown in FIG. 5a. For example, a user may create a document in which the font family selected is Times New Roman, and may select a desired font size for text in the document. In one example, Times New Roman font may be selected from the scrollable font box 414. The text of the document may then be entered into the document through conventional means, such as through a keyboard/keypad or other user interface that the application can interpret to store text. Once the text is entered while the application is running, at least a portion of the text of a document may appear on the 3-D display as conventional 2-D Times New Roman characters, based upon the user selection. FIG. 5a illustrates one such text block 502 whose letters have (2-D) Times New Roman font in a regular typeface. Alternatively, the text block 502 may represent text of a previously created and/or edited document that is loaded into the application for further editing.

Subsequently, the user may select a portion of text of the document for receiving emphasis, as shown in FIG. 5b. The portion of text to apply 3-D emphasis to may be selected using known techniques, such as by using a selection device that is operative to select text in the given application. Such selection devices include a mouse, touchpad, pointing device, digit, and the like. Once selected, the text for receiving emphasis may appear highlighted on the display presenting the text document being edited. FIG. 5b illustrates a highlighted text portion 504 that forms a part of the text block 502. In this example, only the word "jump" has been selected for emphasis in the text block 502.

Consistent with the present embodiments, in a further operation, the user may then select from options provided by the running application that provide 3-D emphasis. Following the example of FIG. 4, the user may select an icon from the typeface component area 416 of menu 402 in order to apply a 3-D typeface to selected characters. FIG. 5c illustrates one example of applying a 3-D typeface by selecting the "3-D" icon 508 of the menu 402. Once the "3-D" icon is selected (engaged), a 3-D typeface component may operate to generate characters of the highlighted text portion 504 that appear to have depth when viewed on the 3-D display 110. For example, the selected characters may be encoded and stored by the application as 3-D typeface characters. FIG. 5c illustrates a 3-D text portion 506 in which the word "jump" appears to have depth to the user in front of 3-D display 110. As noted above with respect to the text block 412 of FIG. 4, the appearance of characters in the 3-D text portion 506 of FIG. 5c is presented for purposes of illustration only and that in operation on an actual stereoscopic display, the characters of the 3-D text portion 506 of FIG. 5c may present a stereoscopic image of the text that imparts a depth into the characters when viewed in normal binocular vision.

Referring again to FIG. 3, in accordance with various embodiments, when an application such as a word processing application 300 is installed in a device a designed depth-based typeface for a given font family such as Times New Roman may be stored in a memory, such as the memory 106 of the 3-D text display apparatus 102. When a user wishes to apply a 3-D typeface to text of an editable text document, the user may select the 3-D typeface by engaging a 3-D icon provided in a menu as described above with respect to FIGS. 5a-5c. The word processing application 300 may retrieve the selected depth based typeface for Times New Roman from the memory 106 to apply the select typeface to designated characters of the editable text document. Multiple different depth based typefaces for multiple different font families may be stored in memory 106 in some embodiments. Thus, whenever a user wishes to apply a given 3-D typeface, the user may select desired 3-D typeface using an interface such as a menu provided by the application used to create or edit the editable text document.

In some embodiments, one or more pre-designed 3-D typefaces may be downloaded and stored manually by a user for use in an application in a manner similar to that available for loading of conventional font families. For example, a user may individually download a Calibri 3-D Typeface to a device for use by that device if that typeface is not already present in an application running 3-D typefaces.

Continuing with the example of FIG. 3, in additional embodiments the 3-D depth scaling component 204 may provide scaling of a 3-D typeface so that a different depth is imparted into a 3-D character depending upon the font size of the 3-D character. Thus, for example, a user may select text within a document to be "Times New Roman (standard) 10." The user may subsequently highlight a portion of text to be rendered in a 3-D typeface. The 3-D depth scaling component 204 may generate a "Times New Roman 3-D 10" typeface, whose characters may exhibit a depth of 3 pixels on a 3-D display. In another example, the user may select text within a document to be "Times New Roman (standard) 36." The user may subsequently highlight a portion of text to be rendered in a 3-D typeface. The 3-D depth scaling component 204 may then generate a "Times New Roman 3-D 36" typeface, whose characters may exhibit a depth of 10 pixels on the 3-D display. This feature of the 3-D typeface component 112 may be especially useful for providing optimal viewing of 3-D characters in displays of different dimensions. Since larger displays may be designed for viewing at a relatively greater distance than smaller displays, the font size for text may typically be larger. Therefore, in order to effectively highlight 3-D characters having 36 font size that are designed to be viewed at a larger distance, a 10 pixel depth may be appropriate so that a viewer can discern depth in the 3-D characters even at a distance of for example, several meters.

In some embodiments the scaling of the depth of a 3-D typeface may be provided by a set of designed typefaces that are stored for use by the word processing application 300. Thus, a stored attribute of "Times New Roman 36 3-D" typeface may be a depth of 10 pixels, while a stored attribute of "Times New Roman 10 3-D" typeface may be a depth of 3 pixels. Accordingly, whenever, a system is running an application including a "Times New Roman 3-D" typeface, when the font size is set to 10 the depth imparted to characters of Times New Roman 3-D typeface is three pixels, while when the font size is set to 36, the depth of characters is 10 pixels.

In further embodiments, one or more font sizes of a 3-D typeface family may include multiple typefaces each having a different depth characteristic. Thus, a font library may store multiple "Times New Roman 36 3-D" typefaces, for example, one having 5 pixel depth and another having a 10 pixel depth. In this manner, a 3-D typeface having the same font size may be displayed differently according to a desired depth to be imparted to the 3-D typeface for emphasis. For example, the Times New Roman 36 3-D typeface having the 5 pixel depth may be selected for display on a tablet computer where a five pixel depth may be sufficient to impart the desired emphasis to 3-D text. On the other hand, a Times New Roman 36 3-D typeface having 10 pixel depth may be selected for display on a 48" display, where viewing of the display may typically take place at a distance of meters. In this latter case, a 10 pixel depth may be more appropriate to convey emphasis to the 3-D text.

In some embodiments, this selection of the typeface depth of a 3-D typeface may be done automatically by the 3-D depth scaling component based upon a determination of the characteristics of a display to present the text having the 3-D typeface. In one instance, the 3-D depth scaling component 204 may check the appropriate library to determine the typeface available in response to a 3-D typeface selection for a given font size. If multiple typeface designs are available each having a different depth characteristic for a given font size, in one example, the 3-D depth scaling component 204 may choose a particular 3-D typeface based upon a determination of the display size of the display to present the 3-D text.

In additional embodiments, the 3-D typeface rendering component 206 may adjust the presentation of text in a digital document based upon the context in which the text is to be displayed. In one example, a digital document may be created or edited to contain characters having 3-D typeface that impart depth to the text when presented on a stereoscopic display. However, in some cases, a user may wish to view the same digital document including the text having 3-D typeface on a display having only 2-D capability. In other cases, the user may wish to print the document or portions of the document that include the text with 3-D typeface. Accordingly, the 3-D typeface rendering component 206 may provide a mapping capability that maps the 3-D typeface in the document to a corresponding 2-D typeface for presentation in a context where the document is not viewed in a stereoscopic display. This mapping capability may be similar to that used in conventional mapping schemes when a font is missing from a system or from a printer to print a digital document. In various embodiments, the 3-D typeface rendering component 206 may be deployed within an application installed on a device, within a device operating system, in a printer server, and/or in a printer to print a document having 3-D typeface, to name a few examples.

In some embodiments, the 3-D typeface may be mapped to a conventional 2-D typeface. For example, a Times New Roman 3-D font may be employed in select text of a digital document for display of the digital document on a stereoscopic display. When the digital document is loaded for presentation on the 2-D display, the 3-D typeface rendering component 206 may map the Times New Roman 3-D font to a Times New Roman Italic Underlined font. Thus, any highlighted text in the digital document that is to be presented in the Times New Roman 3-D font when shown on a stereoscopic display may appear as a Times New Roman Italic Underlined font on a 2-D display.

Figure 6:
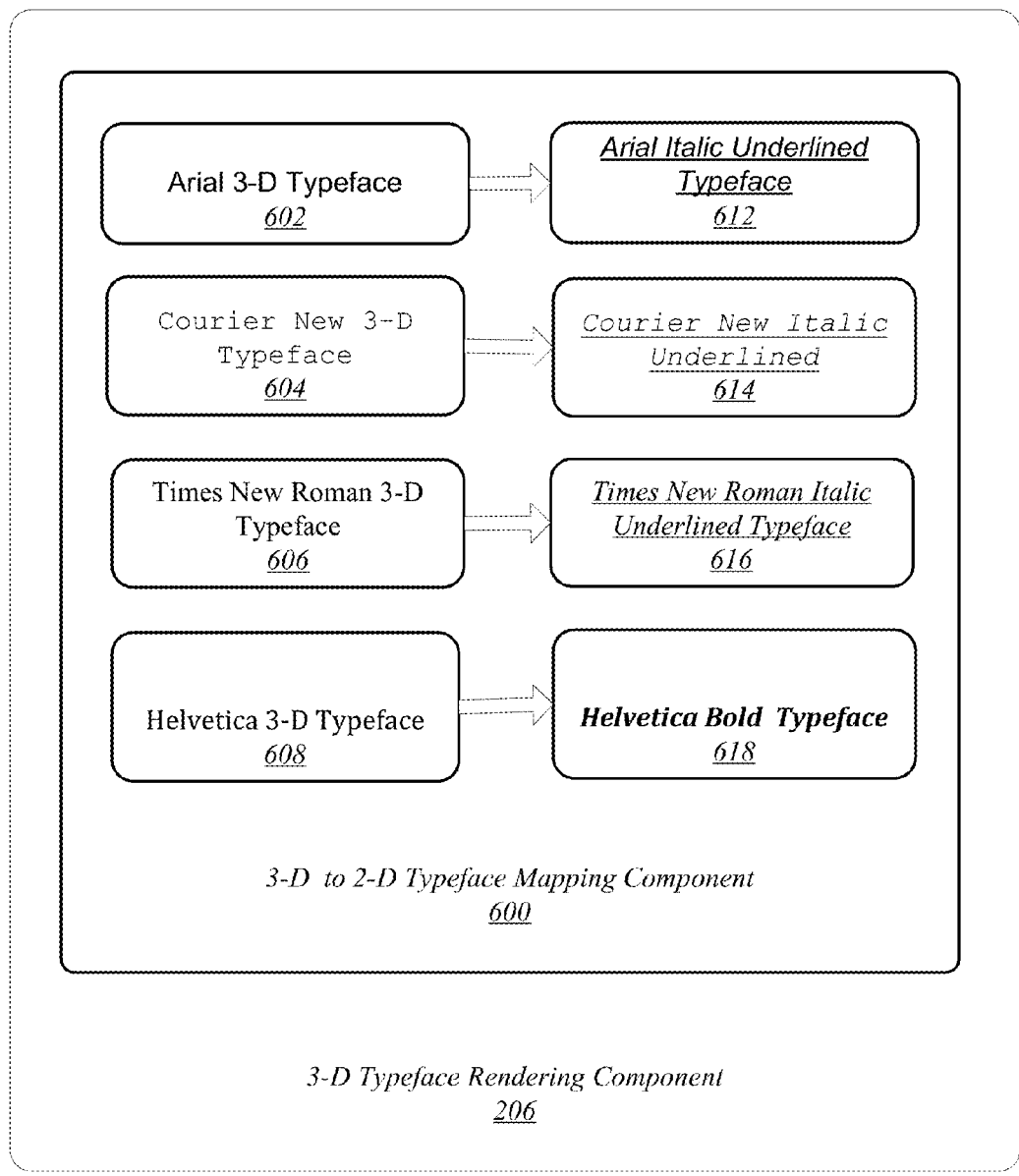
FIG. 6 depicts further details of with an embodiment of the apparatus of FIG. 1.

In some embodiments, the 3-D typeface rendering component 206 may, for example, check that an output device (display) that is coupled to the application that edits the digital document is a 2-D display. Once this determination is made, mapping of the selected 3-D typeface to a 2-D typeface is performed. FIG. 6 depicts one implementation of the 3-D typeface rendering component 206, in which a 3-D to 2-D typeface mapping component 600 provides a mapping function that specifies a 2-D typeface to be applied when for a given selected 3-D typeface under circumstances in which the text containing the characters selected for 3-D typeface is not to be presented in a stereographic display. As illustrated, the Arial 3-D Typeface 602 is mapped to a Arial Italic Underlined Typeface 612, the Courier New 3-D Typeface 604 is mapped to a Courier New Italic Underlined Typeface 614, the Times New Roman 3-D Typeface 606 is mapped to a Times New Roman Italic Underlined Typeface 616, and the Helvetica 3-D typeface 608 is mapped to a Helvetica Bold typeface 618.

In some embodiments, the mapping from 3-D font to 2-D font for text to be emphasized in a digital document may vary according to the medium to present the 2-D font. Thus, a digital display device may employ the aforementioned scheme to map characters designed for Times New Roman 3-D font to a Times New Roman Italic Underlined font. On the other hand, a printer device, which may have a different set of stored fonts, may map characters designed for the Times New Roman 3-D font to a Times New Roman Bold font in one example.

The aforementioned mapping of 3-D typeface to 2-D typeface may fulfill multiple functions. For one, by providing a non-regular 2-D typeface, the 2-D typeface that results from the mapping may ensure that emphasis is placed in the intended text to be emphasized when the text document is viewed on a 2-D display or in a printed form. In addition, the user may be apprised of the fact that the intended 3-D typeface has been stored for the selected text of a document being edited. For example, a user may prepare and/or edit an editable text document using a device having a 2-D digital display. Using the aforementioned example for Times New Roman font family, the convention for representing text of the document that is selected for 3-D typeface may be to generate Times New Roman Italic Underlined typeface when the device presenting the document is not a stereographic display, such as a 2-D display. Because the user may be aware of this convention, as soon as the user selects given text and applies a mechanism such as an icon to render the text in the desired 3D typeface, the appearance of the designated text in a Times New Roman Italic Underlined typeface confirms to the user that the document being edited has generated the appropriate 3-D typeface for the intended text even though the text cannot be currently viewed in stereographic form.

In further embodiments, the 3-D typeface rendering component 206 may provide selective rendering of designated text into a 3-D typeface. For example, a hybrid 3-D typeface may include only a portion of all available characters in the typeface as 3-D characters. In one example, common characters such as alphanumerics as depth-based characters may be 3-D characters, while other characters of the typeface such as certain symbols are two-dimensional in that they do not generate the perception of depth when displayed on a screen. Thus, for example, when a set of characters in a text document is selected for emphasis using the hybrid 3-D typeface, some characters may appear to have depth while others do not when shown on a 3-D display.

In other embodiments, a default or universal 3-D typeface may be provided as a means to supply text emphasis in an editable text document. In one example, a user may designate a font such as Calibri (Regular) as the default appearance of text in a document. The user may then select certain text for 3-D emphasis by, for example, engaging a "3-D" icon as described above. However, instead of providing a special "Calibri 3-D" font, the application 300 may provide a "Universal 3-D" typeface to the selected text. Similarly, if the user designates Verdana (Regular) as the default appearance of text in a document, the application 300 may provide a "Universal 3-D" typeface to the selected text for 3-D presentation instead of a special "Regular" font. As explained below with respect to FIG. 7, the application of a "Universal 3-D" typeface may be take place when desired 3-D typefaces aren't available but when 3-D emphasis is still desirable for select text.

Figure 7:
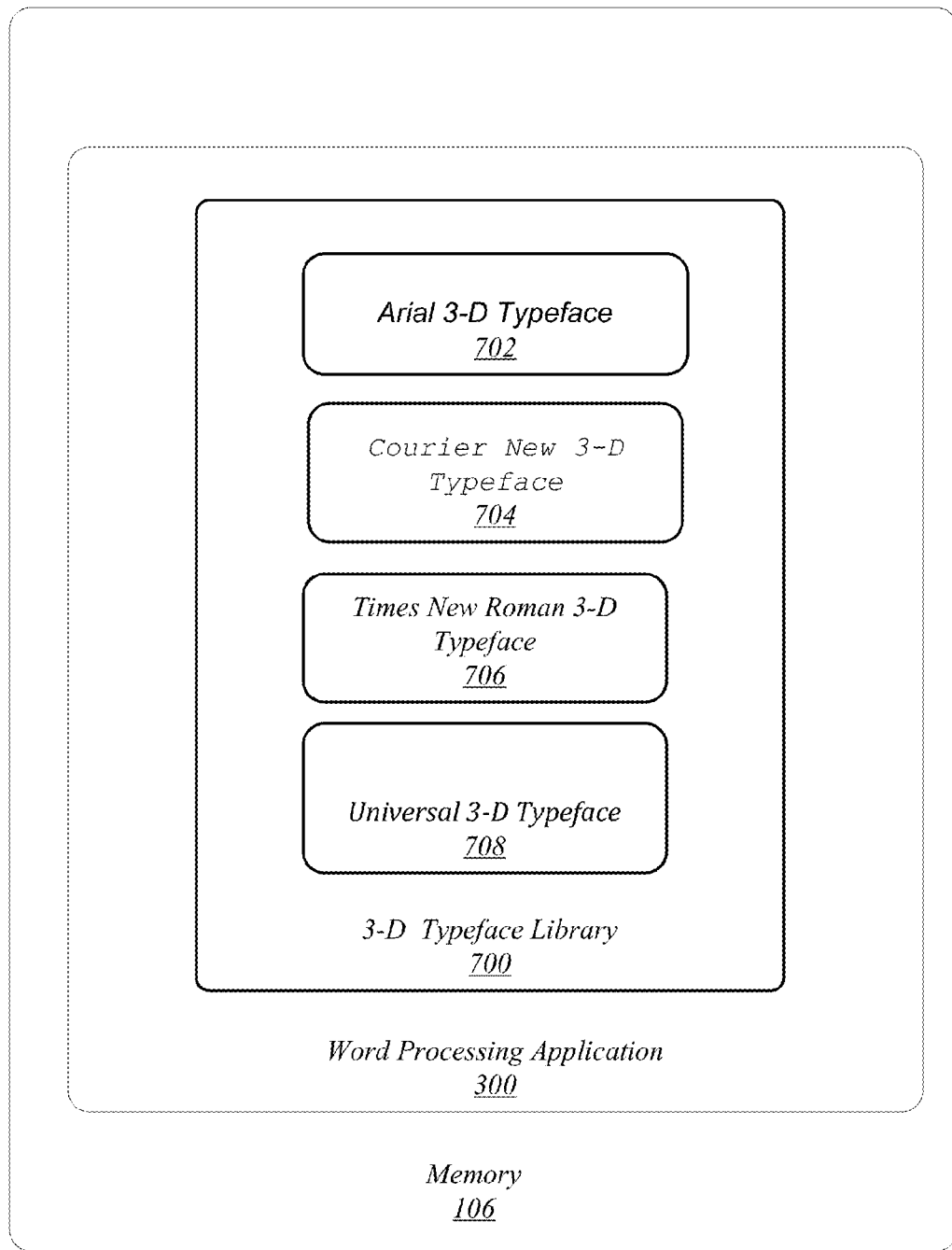
FIG. 7 depicts additional details of an embodiment of the apparatus of FIG. 1.

Continuing with the example of FIG. 3, the 3-D typeface rendering component 206 may be operative to automatically adjust typeface of text in response to a user selection in a manner that accounts for the characteristics of available 3-D typeface. For example, the word processing application 300 may generate the menu 402 that provides the "3-D" icon, which allows a user to select 3-D typeface for presentation of text. In some cases, however, the menu may provide 2-D typeface, such as Calibri, for which no corresponding 3-D typeface exists in the word processing application 300. FIG. 7 depicts an embodiment of a 3-D typeface library 700, which may be stored as part of the word processing application 300, for example. As illustrated, the 3-D typeface library 700 includes an Arial 3-D typeface 702, Courier New 3-D typeface 704, Times New Roman 3-D typeface 706, and Universal 3-D typeface 708. In this case, no Calibri 3-D typeface is stored in 3-D typeface library 700. In one scenario, however, a user running word processing application 200 may edit a document that includes Calibri (regular) text, and may select certain text for emphasis by applying a 3-D typeface. The user may, for example, highlight a block of text that is displayed in Calibri (regular) font and engage the "3D" icon at the same time. The 3-D typeface rendering component 206 may determine based on the currently highlighted text font (Calibri) and the selection of the "3D" icon, that a selection of Calibri 3-D typeface has been made. The 3-D typeface rendering component 206 may then determine that the selected Calibri 3-D typeface is not stored the 3-D typeface library 700. Consequently, in one embodiment, the 3-D typeface rendering component may select a different, but available, typeface for presenting the highlighted text, instead of the selected Calibri 3-D typeface. For example, a Universal 3-D typeface 708 may be stored as part of the word processing application 300, which is invoked in circumstances that include cases where 3-D typeface is requested but the selected 3-D typeface is not available. Thus, when the user invokes Calibri 3-D typeface for text, such as highlighted text, the 3-D typeface rendering component 206 may instead retrieve the Universal 3-D typeface 708 and render the selected text in the Universal 3-D typeface.

In an additional variant, the 3-D typeface rendering module 206 may render selected text in a 2-D typeface if the selected 3-D typeface is not available. For example, following the above illustration the selected text may be presented as Calibri Italic Bold instead of the intended but unavailable Calibri 3-D. In this latter case, the selected text may appear in Calibri Italic Bold typeface whether presented on a 2-D or 3-D display.

In a further embodiment, the 3-D typeface component 112 may generate a message apprising the user when a selected 3-D typeface is not available. In one variant, the "unavailable 3-D typeface" message may be generated while the selected text is rendered in an available 3-D typeface, while in a different variant the "unavailable 3-D typeface" message may be generated without altering the selected text to afford an opportunity for a different 3-D typeface to be selected. For example, the user, upon being apprised that a selected Calibri 3-D typeface is not available, may instead select Times New Roman 3-D, which may be available to alter the selected text for emphasis in a 3-D format.

In further embodiments, instead of providing 3-D typeface for designated text by applying a 3-D typeface to selected text, the depth may be added as a separate 3-D object that can be pasted into the document being edited. For example, an "art" object function or application may allow 3-D text to be entered into a separate component that stores the text and presents the text as a 3-D object that can be inserted into the main editable text document. However, in this approach, the 3-D text inserted as an object may lose its text attributes, such as search, edit when stored in the word processing application used to create and edit the main editable text document.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
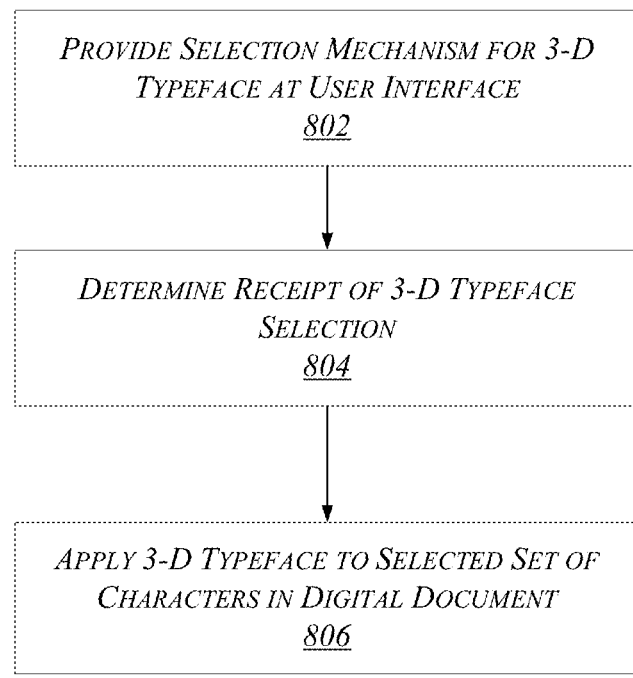
FIG. 8 presents an exemplary first logic flow.

FIG. 8 depicts an exemplary first logic flow 800. At block 802 a selection mechanism is provided for 3-D typeface at a user interface. In one example, the selection mechanism may include a formatting bar that is generated on a display screen and that displays selectable items. In one particular example, the formatting bar may include a scrollable font menu that provides multiple font families for selection and an icon for applying 3-D typeface to selected text. However, other selection mechanisms are possible. At block 804 it is determined that a selection for 3-D typeface has been made. For example, a user may engage an icon or other component of a formatting bar that indicates 3-D formatting is to be applied. At block 806, a 3-D typeface is applied to selected set of characters in a digital document. In one example, a selection of text in an editable text document may be received when a user highlights the text in a word processing application. The user may engage a "3D" icon for the selected text so that the selected text to be rendered in 3-D is identified.

Figure 9:
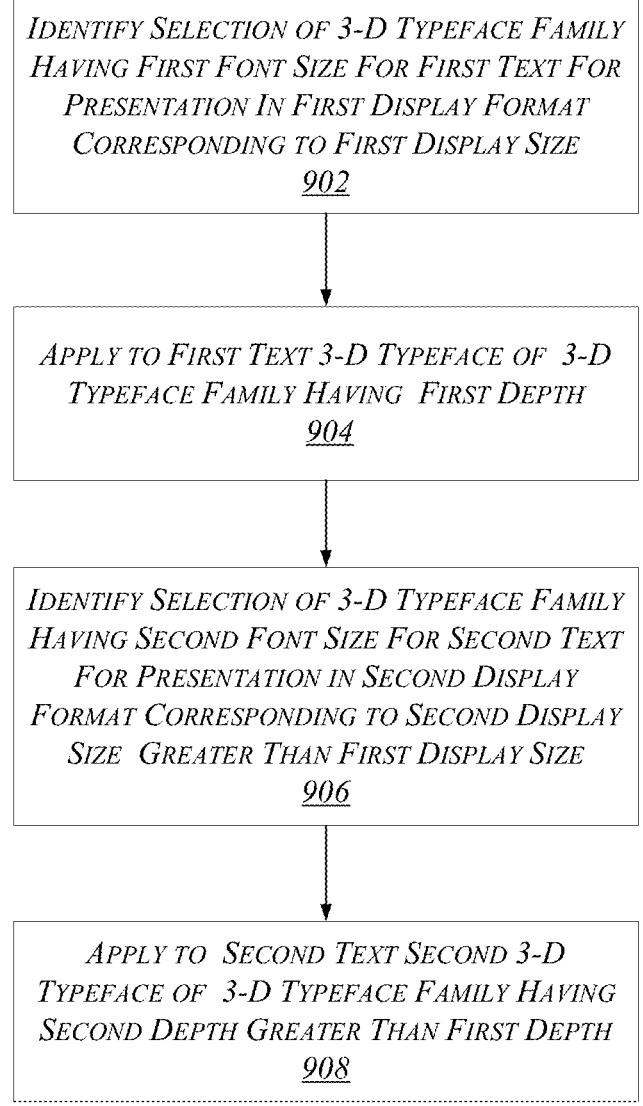
FIG. 9 presents an exemplary second logic flow.

FIG. 9 depicts an exemplary second logic flow. At block 902, a selection of a 3-D typeface family having a first font size for first text for presentation in a first display format corresponding to a first display size is identified. For example, a user may select a 3-D typeface family such as Times New Roman 3-D having a 36 font size for display of given text in a tablet computer. At block 904, a 3-D typeface of the 3-D typeface family having a first depth is applied to the first text. For example, a Time New Roman 3-D 36 typeface having 5 pixel depth may be applied. At block 906, a selection of the 3-D typeface family having the first font size is received for second text for presentation in a second display format corresponding to a second display size larger than the first display size. At block 908, a second 3-D typeface of the 3-D typeface family is applied to the second text having a second depth greater than the first depth. For example, a Time New Roman 3-D 36 typeface having 10 pixel depth may be applied.

Figure 10:
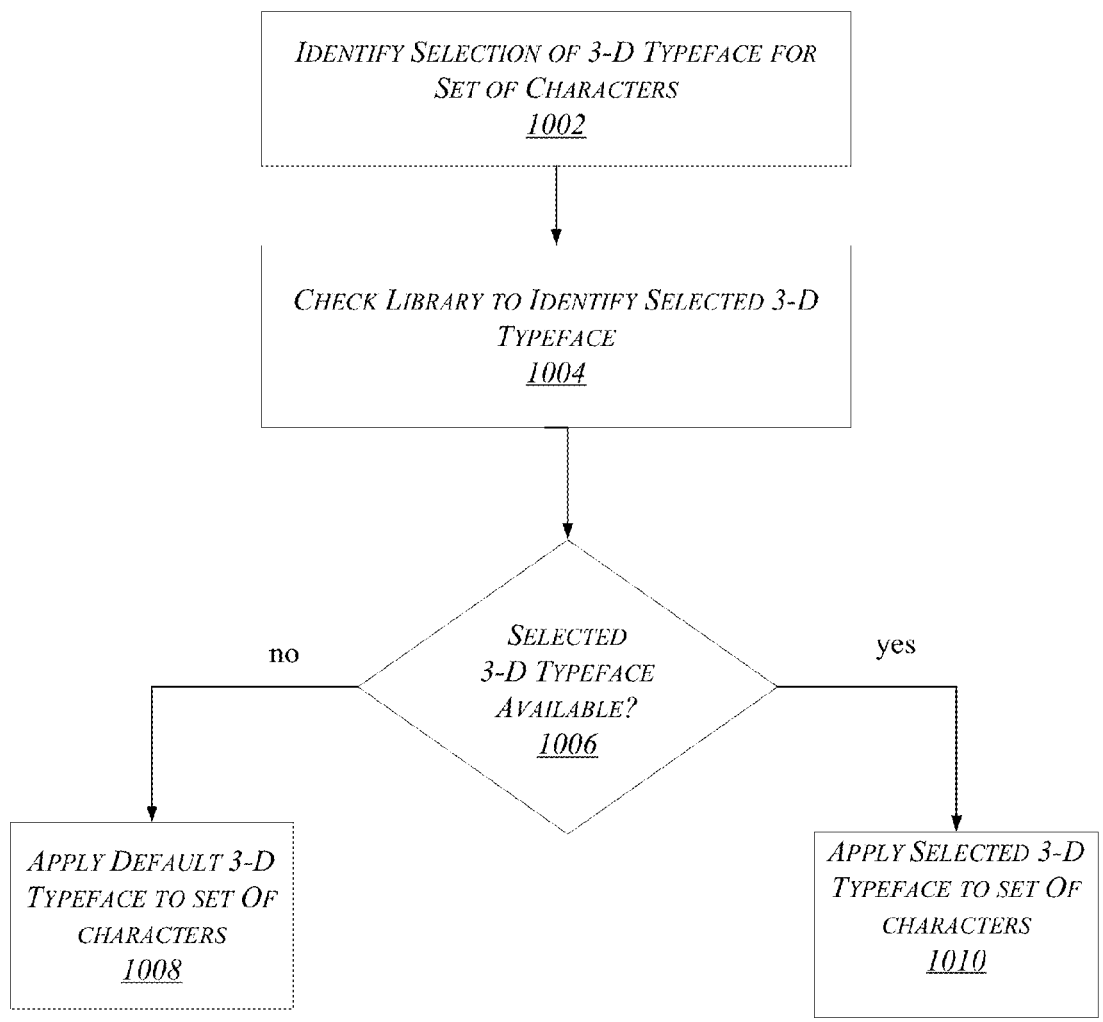
FIG. 10 presents an exemplary third logic flow.

FIG. 10 depicts an exemplary third logic flow. At block 1002, a selection of 3-D typeface is identified for a set of characters, such as text in an editable text document. At block 1004, a library is checked to identify the selected 3-D typeface. The flow then proceeds to block 1006 where a determination is made as to whether the selected typeface is available. If not, the flow moves to block 1008, where a default set of 3-D typeface is applied to the set of characters. If so, the flow moves to block 1010 where the 3-D typeface is applied to the selected set of characters.

Figure 11:
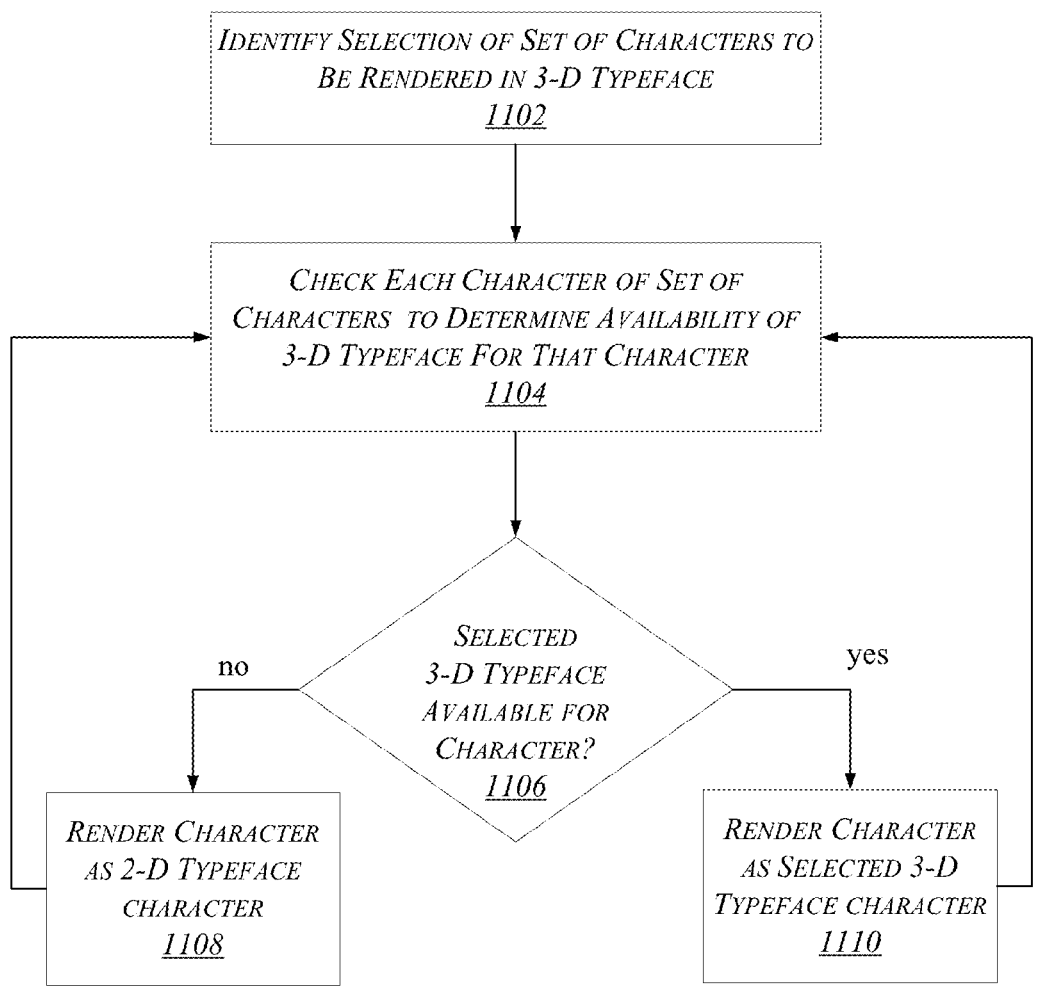
FIG. 11 presents an exemplary fourth logic flow.

FIG. 11 presents an exemplary fifth logic flow. At block 1102, a selection of a set of characters is identified to be rendered in 3-D typeface. At block 1104, each character of the set of characters is checked to determine the availability of a 3-D typeface for that character. At block 1106, a determination is made for each character as to whether the 3-D typeface is available for that character. If the 3-D typeface is not available for the character, the flow moves to block 1108, where the character is rendered as a 2-D character. The flow then returns to block 1104. If the 3-D typeface is available, the flow moves to block 1112, where the 3-D typeface is applied to the character in question. The flow then returns to block 1104.

Figure 12:
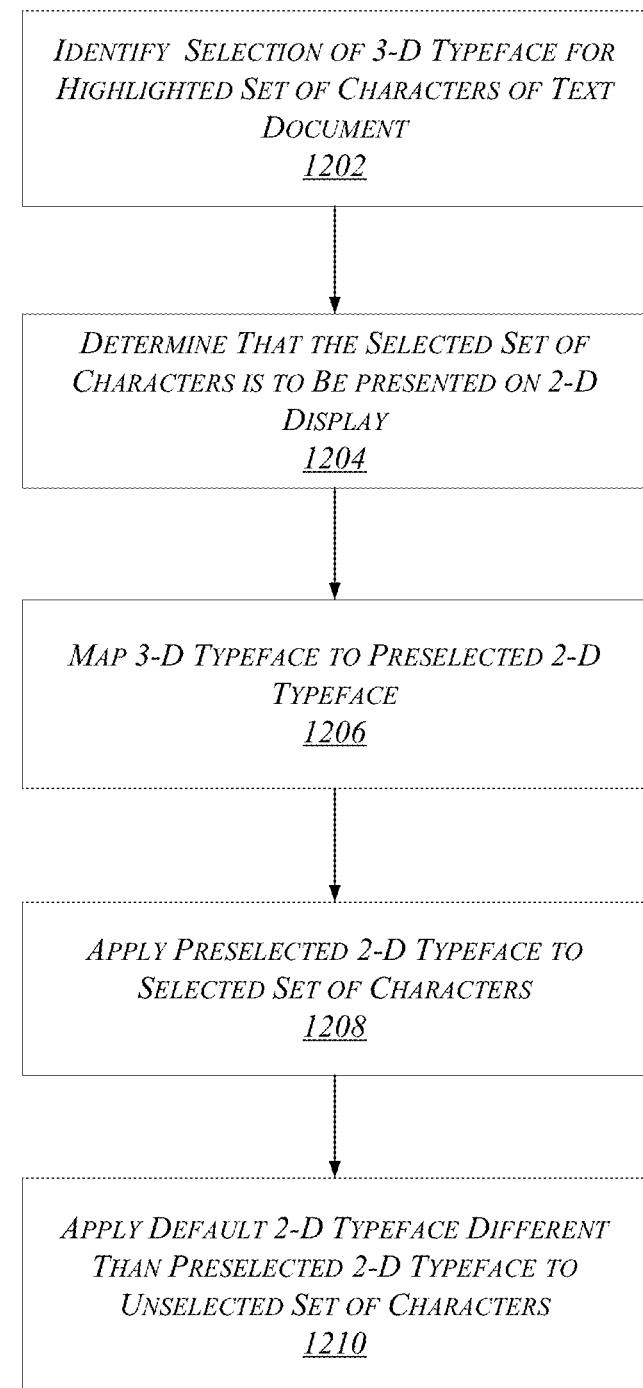
FIG. 12 presents an exemplary fifth logic flow.

FIG. 12 depicts an exemplary fifth logic flow. At block 1202, a selection of 3-D typeface is identified for a highlighted set of characters in a text document. At block 1204 a determination is made that the selected set of characters is to be presented in two dimensional (non-stereographic) display. At block 1206 the 3-D typeface is mapped to a preselected 2-D typeface. At block 1208, the preselected 2-D typeface is applied to the selected set of characters in the text document. At block 1210, a default 2-D typeface different than the preselected typeface is applied to unselected characters of the text document.

Figure 13:
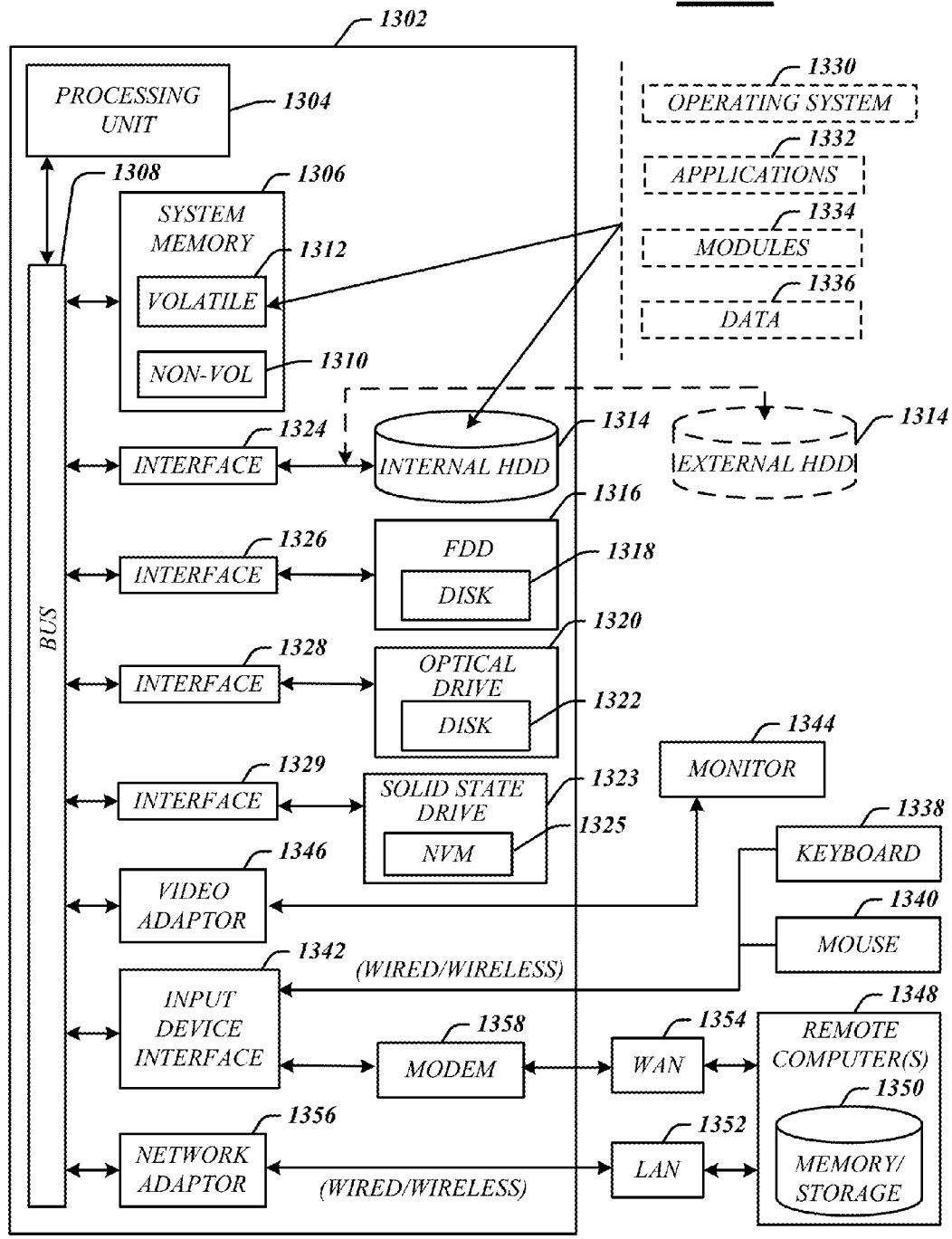
FIG. 13 is a diagram of an exemplary system embodiment.

FIG. 13 illustrates an embodiment of an exemplary computing architecture 1300 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors. Dual microprocessors and other multi-processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD); and a solid state drive (SSD) 1323 to read or write data to/from a non-volatile memory (NVM) 1325, including a NAND flash memory, phase change memory (PCM), a spin memory; phase change memory with switch (PCMS), magnetoresistive random access memory (MRAM), spin memory, nanowire memory, ferroelectric transistor random access memory (FeTRAM). The HDD 1314, FDD 1316, optical disk drive 1320, and solid state drive 1323 can be connected to the system bus 1308 by a HDD interface 1324, an FDD interface 1326, an optical drive interface 1328, and a solid state drive interface 1329, respectively. The HDD interface 1324 for external drive implementations can include at least one or both of Universal Serial Bus (USB) and IEEE 1394 interface technologies. The solid state drive interface 1329 may comprise any suitable interface for coupling to the host device, such as, for example, but not limited to, a serial advanced technology attachment (SATA) interface, a serial attached SCSI (SAS) interface, a universal serial bus (USB) interface, a peripheral control interface (PCI), or other suitable device interface.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include-a processor circuit and a three-dimensional (3-D) typeface component. The 3-D typeface component may be operative on the processor circuit to provide a choice of one or more 3-D typefaces in a graphical user interface displayed on a digital display, determine that a selection of a 3-D typeface has been received, and apply the 3-D typeface to a selected set of characters in a digital document that includes editable text.

In another embodiment the 3-D typeface component may be operable on the processor circuit to generate a stereoscopic image of the selected set of characters when presented in a digital display format.

Alternatively, or in addition, in a further embodiment the 3-D typeface component may be operable on the processor circuit to identify a selection of a 3-D typeface family having a first font size for first text for presentation in a first display format corresponding to a first display size;

Alternatively, or in addition, in a further embodiment the 3-D typeface component may be operable on the processor circuit to determine that the selected set of characters is to be presented in a two-dimensional (2-D) format, map the 3-D typeface to a preselected 2-D typeface, and apply the preselected 2-D typeface to the selected set of characters.

Alternatively, or in addition, in a further embodiment the 3-D typeface component may be operable on the processor circuit to present the 3-D typeface selection as an icon in a typeface menu.

Alternatively, or in addition, in a further embodiment the 3-D typeface component may be operable on the processor circuit to identify the selected set of characters from highlighted text.

Alternatively, or in addition, in a further embodiment the 3-D typeface component may be operable on the processor circuit to identify a selection of an icon denoting a 3-D typeface, identify a designation of the selected set of characters based upon highlighted text, and apply to the selected set of characters a 3-D typeface having a depth value based upon a selected font size of the selected set of characters.

Alternatively, or in addition, in a further embodiment the 3-D typeface component may be operable on the processor circuit to identify a selection designating a 3-D typeface, search a library for the 3-D typeface, and apply a default 3-D typeface if the designated 3-D typeface is not present in the library.

Alternatively, or in addition, in a further embodiment the 3-D typeface component may be operable on the processor circuit to generate a message indicating that a designated 3-D typeface is not available.

Alternatively, or in addition, in a further embodiment the 3-D typeface component may be operable on the processor circuit to identify a designation of a set of characters, determine that a selection of the three-dimensional (3-D) typeface has been received, render a first sub-set of characters of the designated set of characters as 3-D characters, the first sub-set of characters corresponding to characters stored in a memory for the 3-D typeface, and present a second sub-set of characters of the designated set of characters as 2-D characters, the second sub-set of characters corresponding to characters not stored in the memory for the 3-D typeface.

Alternatively, or in addition, in a further embodiment the 3-D typeface component may be operable on the processor circuit to store selected text for display as 3-D text in an editable art object to be inserted in the digital document.

Alternatively, or in addition, in a further embodiment the apparatus may comprise a stereographic display to present the selected set of characters as stereographic characters.

In a further embodiment, a method may include providing a choice of one or more three-dimensional (3-D) typefaces in a user interface, determining that a selection of a 3-D typeface selection has been received, and applying the 3-D typeface to a selected set of characters in a digital document that includes editable text.

In another embodiment, the method may comprise extracting-generating a stereoscopic image of the selected set of characters when presented in a digital display format.

Alternatively, or in addition, in a further embodiment, the computer implemented method may comprise identifying a selection of a 3-D typeface family having a first font size for first text to be presented in a first display format corresponding to a first display size, applying to the first text a 3-D typeface of the 3-D typeface family having a first depth, identifying a selection of the 3-D typeface family having the first font size for second text to be presented in a second display format corresponding to a second display size larger than the first display size, and applying to the second text a second 3-D typeface of the 3-D typeface family having a second depth greater than the first depth.

Alternatively, or in addition, in a further embodiment, the computer implemented method may comprise determining that the selected set of characters is to be presented in a two-dimensional (2-D) format, mapping the 3-D typeface to a preselected 2-D typeface, and applying the preselected 2-D typeface to the selected set of characters.

Alternatively, or in addition, in a further embodiment, the computer implemented method may comprise presenting the 3-D typeface selection as an icon in a typeface menu.

Alternatively, or in addition, in a further embodiment, the computer implemented method may comprise searching a library for the 3-D typeface, and applying a default 3-D typeface if the designated 3-D typeface is not present in the library.

Alternatively, or in addition, in a further embodiment, the computer implemented method may comprise identifying a designation of a set of characters determining that a selection of the three-dimensional (3-D) typeface selection has been received rendering a first sub-set of characters of the selected set of characters as 3-D characters, the first sub-set of characters corresponding to characters stored in a memory for the 3-D typeface and presenting a second sub-set of characters of the selected set of characters as 2-D characters, the second sub-set of characters corresponding to characters not stored in the memory for the 3-D typeface.

Alternatively, or in addition, in a further embodiment, the computer implemented method may comprise encoding the selected set of characters in the digital document as a set of 3-D characters.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a processor circuit; and
    a three-dimensional (3-D) typeface component operative on the processor circuit to:
        provide a choice of one or more 3-D typefaces in a graphical user interface;
        receive a selection of a 3-D typeface for a selected set of characters in a digital document that includes editable text;
        in response to a determination that the selected set of characters is to be presented on a 3-D display:
            apply the 3-D typeface to the selected set of characters; and
            generate a stereoscopic image of the selected set of characters when presented in a digital display format; and
        in response to a determination that the selected set of characters is to be presented on a two-dimensional (2-D) display:
            map the 3-D typeface to a 2-D typeface; and
            apply the 2-D typeface to the selected set of characters.

2. The apparatus of claim 1, the 3-D typeface component operative to:
    identify a selection of a 3-D typeface family having a first font size for first text for presentation in a first display format corresponding to a first display size;
    apply to the first text a 3-D typeface of the 3-D typeface family having a first depth;
    identify a selection of the 3-D typeface family having the first font size for second text for presentation in a second display format corresponding to a second display size that is larger than the first display size;
    apply to the second text a second 3-D typeface of the 3-D typeface family having a second depth greater than the first depth.

3. The apparatus of claim 1, the 3-D typeface component operative to present the 3-D typeface selection as an icon in a typeface menu.

4. The apparatus of claim 1, the 3-D typeface component operative to identify the selected set of characters from highlighted text.

5. The apparatus of claim 1, the 3-D typeface component operative to:
    identify a selection of an icon denoting a 3-D typeface;
    identify a designation of the selected set of characters based upon highlighted text; and
    apply to the selected set of characters a 3-D typeface having a depth value based upon a selected font size of the selected set of characters.

6. The apparatus of claim 1, the 3-D typeface component operative to:
    identify a selection designating a 3-D typeface;
    search a library for the 3-D typeface; and
    apply a default 3-D typeface if the designated 3-D typeface is not present in the library.

7. The apparatus of claim 1, the 3-D typeface component operative to generate a message indicating that a designated 3-D typeface is not available.

8. The apparatus of claim 1, the 3-D typeface component operative to:
    identify a designation of a set of characters;
    determine that a selection of the three-dimensional (3-D) typeface has been received;
    render a first sub-set of characters of the designated set of characters as 3-D characters, the first sub-set of characters corresponding to characters stored in a memory for the 3-D typeface; and
    present a second sub-set of characters of the designated set of characters as 2-D characters, the second sub-set of characters corresponding to characters not stored in the memory for the 3-D typeface.

9. The apparatus of claim 1, the 3-D typeface component operative to store selected text for display as 3-D text in an editable art object to be inserted in the digital document.

10. The apparatus of claim 1, comprising a stereographic display to present the selected set of characters as stereographic characters.

11. The apparatus of claim 1, the 3-D typeface component further comprising a scaling component operative to adjust the appearance of the 3-D text based on the font size of the text to be displayed.

12. At least one non-transitory computer-readable storage medium comprising instructions that, when executed, cause a system to:
    provide a choice of one or more three-dimensional (3-D) typefaces in a user interface;
    receive a selection of a 3-D typeface for a selected set of characters in a digital document that includes editable text;
    in response to a determination that the selected set of characters is to be presented on a 3-D display:
        apply the 3-D typeface to the selected set of characters; and
        generate a stereoscopic image of the selected set of characters when presented in a digital display format, and
    in response to a determination that the selected set of characters is to be presented on a two-dimensional (2-D) display:
        map the 3-D typeface to a 2-D typeface; and
        apply the 2-D typeface to the selected set of characters.

13. The at least one non-transitory computer-readable storage medium of claim 12 comprising instructions that, when executed, cause a system to:
    identify a selection of a 3-D typeface family having a first font size for first text to be presented in a first display format corresponding to a first display size;
    apply to the first text a 3-D typeface of the 3-D typeface family having a first depth;
    identify a selection of the 3-D typeface family having the first font size for second text to be presented in a second display format corresponding to a second display size larger than the first display size;
    apply to the second text a second 3-D typeface of the 3-D typeface family having a second depth greater than the first depth.

14. The at least one non-transitory computer-readable storage medium of claim 12 comprising instructions that, when executed, cause a system to present the 3-D typeface selection as an icon in a typeface menu.

15. The at least one non-transitory computer-readable storage medium of claim 12 comprising instructions that, when executed, cause a system to identify the selected set of characters from highlighted text.

16. The at least one non-transitory computer-readable storage medium of claim 12 comprising instructions that, when executed, cause a system to:
identify a selection of an icon denoting a 3-D typeface;
identify a designation of the selected set of characters based upon highlighted text; and
apply a depth value to the 3-D typeface to be applied to the selected set of characters based upon a selected font size of the selected set of characters.

17. The at least one non-transitory computer-readable storage medium of claim 12 comprising instructions that, when executed, cause a system to:
identify a selection designating a 3-D typeface;
search a library for the 3-D typeface; and
apply a default 3-D typeface if the designated 3-D typeface is not present in the library.

18. The at least one non-transitory computer-readable storage medium of claim 12 comprising instructions that, when executed, cause a system to provide a message indicating that a designated 3-D typeface is not available.

19. The at least one non-transitory computer-readable storage medium of claim 12 comprising instructions that, when executed, cause a system to:
identify a designation of a set of characters;
determine that a selection of the three-dimensional (3-D) typeface selection has been received;
render a first sub-set of characters of the selected set of characters as 3-D characters, the first sub-set of characters corresponding to characters stored in a memory for the 3-D typeface; and
present a second sub-set of characters of the selected set of characters as 2-D characters, the second sub-set of characters corresponding to characters not stored in the memory for the 3-D typeface.

20. The at least one non-transitory computer-readable storage medium of claim 12 comprising instructions that, when executed, cause a system to store selected text for display as 3-D text in an editable art object to be inserted in the digital document.

21. The at least one non-transitory computer-readable storage medium of claim 12 comprising instructions that, when executed, cause a system to apply a 3-D scaling component to adjust the appearance of the 3-D text based on the font size of the text to be displayed.

22. A computer-implemented method, comprising:
providing a choice of one or more three-dimensional (3-D) typefaces in a user interface;
receiving a selection of a 3-D typeface for a selected set of characters in a digital document that includes editable text;
in response to a determination that the selected set of characters is to be presented on a 3-D display:
applying the 3-D typeface to the selected set of characters; and
generating a stereoscopic image of the selected set of characters when presented in a digital display format, and
in response to a determination that the selected set of characters is to be presented on a two-dimensional (2-D) display:
mapping the 3-D typeface to a 2-D typeface; and
applying the 2-D typeface to the selected set of characters.

23. The computer implemented method of claim 22, comprising:
identifying a selection of a 3-D typeface family having a first font size for first text to be presented in a first display format corresponding to a first display size;
applying to the first text a 3-D typeface of the 3-D typeface family having a first depth;
identifying a selection of the 3-D typeface family having the first font size for second text to be presented in a second display format corresponding to a second display size larger than the first display size; and
applying to the second text a second 3-D typeface of the 3-D typeface family having a second depth greater than the first depth.

24. The computer-implemented method of claim 22, comprising encoding the selected set of characters in the digital document as a set of 3-D characters.

25. The computer-implemented method of claim 22, comprising:
identifying a designation of a set of characters;
determining that a selection of the three-dimensional (3-D) typeface selection has been received;
rendering a first sub-set of characters of the selected set of characters as 3-D characters, the first sub-set of characters corresponding to characters stored in a memory for the 3-D typeface; and
presenting a second sub-set of characters of the selected set of characters as 2-D characters, the second sub-set of characters corresponding to characters not stored in the memory for the 3-D typeface.

26. The computer-implemented method of claim 22, comprising:
searching a library for the 3-D typeface; and
applying a default 3-D typeface if the designated 3-D typeface is not present in the library.

27. The computer-implemented method of claim 22, comprising applying a 3-D scaling component to adjust the appearance of the 3-D text based on the font size of the text to be displayed.

* * * * *